July 18, 1967

K. D. McCLURE 3,331,973

MAGNETIC MOTOR

Filed Dec. 7, 1964

INVENTOR.
KENNETH D. McCLURE
BY
AGENT

United States Patent Office 3,331,973
Patented July 18, 1967

3,331,973
MAGNETIC MOTOR
Kenneth D. McClure, 1522 Brockton Ave.,
Los Angeles, Calif. 90025
Filed Dec. 7, 1964, Ser. No. 416,482
9 Claims. (Cl. 310—46)

ABSTRACT OF THE DISCLOSURE

This invention relates to dynamoelectric machines and is particularly concerned with motors, it being a general object of this invention to advantageously utilize the pull of magnets in order to gain motive power from a relatively small amount of current.

---

Magnet motors, and the like, have been proposed, and permanent magnets of great strength are available for the attraction of ferrous bodies. Heretofore, the systems of magnets employed in such machines has been cumbersome and apparently inefficient, and it is therefore a primary object of this invention to provide an effective relationship of magnets and ferrous bodies that are controllably attracted to and repelled from said magnets in order to most efficiently realize the potential power of said magnets.

Generally, this invention employs magnets for the utilization of their attraction and repulsion powers, and in the cooperative combination therewith the employment of ferrous bodies hereinafter referred to as poles and which are attracted to and repelled from the said magnets. In the particular embodiment disclosed permanent magnets are used in which case the machine employs direct current; however, it is to be understood that magnets in the broadest sense can also be wire-wound magnets in which case the polarity thereof is synchronously reversible and in which case the machine can employ alternating current. Characteristically, however, the machine disclosed herein has a rotor and a stator, one of which comprises magnets (permanent or wire-wound) and the other of which comprises controllable pole pieces. The said controllable pole pieces are wire-wound ferrous elements that are attracted to and repelled from the magnets, and in accordance with the invention it is the winding and commutation of these poles that makes for a practical and efficient electrical machine in the form of a motor or the like.

An object of this invention is to provide an improved geometrical relationship of stator and rotor in an electircal machine, all to the end that continuous rotary motion is gained in utilizing the full force and effect of magnetism.

Figure 1:
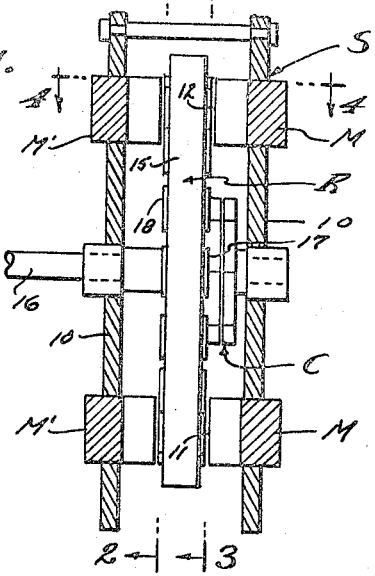

The various objects and features of this invention will be fully understood from the following detailed description of the typical preferred form and application thereof, throughout which description reference is made to the accompanying drawings, in which:

FIG. 1 is a cross sectional view taken through the electric machine herein disclosed.

Figure 2:
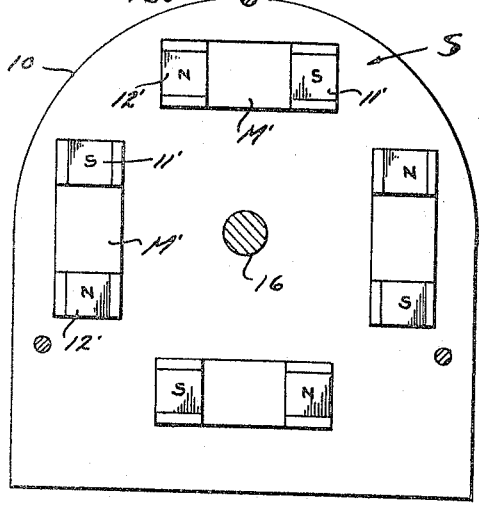
Figure 3:
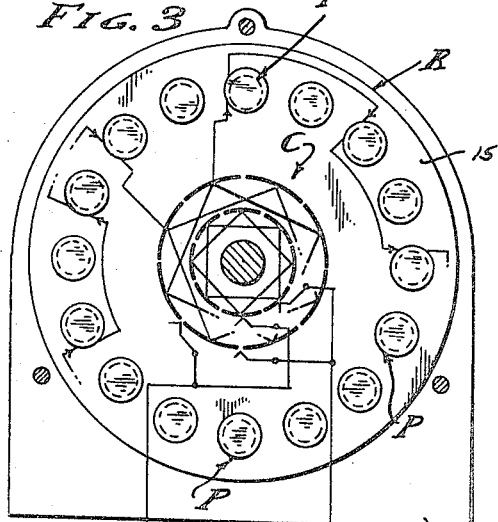

FIGS. 2 and 3 are views taken substantially as indicated by lines 2—2 and 3—3 on FIG. 1.

Figure 4:
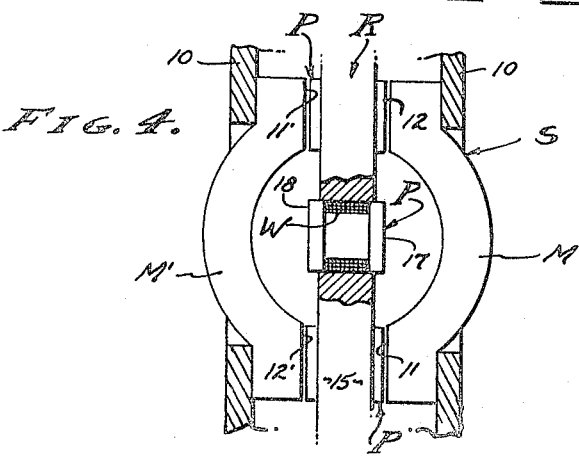

FIG. 4 is a fragmentary view taken as indicated by line 4—4 on FIG. 1.

This electric machine is useful as a motor operable on direct current and will be described in this connection. Characteristically, the machine involves a rotor R and a stator S and either one or the other of which can be chosen as the field; and comprises one or more magnets M. Consequently, the rotor R is the armature and in accordance with the invention comprises at least two poles P. In this preferred form, however, the rotor R comprises four poles P for each field magnet in order that a pole P always occurs between magnet poles of the field. In carrying out this invention the stator S involves a plurality of magnets M and for example is shown as involving four magnets M disposed in a circumferential series, in which case the rotor R preferably involves, a multiplicity of poles P—sixteen in number—also disposed in a circumferential series. When a magnet M is referred to, it is a complete magnet which comprises the north and south poles; and when a pole P is referred to, it is a body of ferrous material which in accordance with the invention is necessarily wire-wound, or the like, which is referred to.

The stator S comprising the magnet or magnets M is shown as made up of a frame 10 of circular configuration, with the magnets M disposed therein. A most efficient disposition of the magnets has been found to be that which is clearly illustrated in the drawings and wherein the pole faces 11 and 12 of the magnets are in a common circumferential plane that is normal to the rotational axis of the machine. Therefore, each magnet involves north and south pole faces 11 and 12, respectively, angularly displaced in equal increments, and in the case illustrated at 45° increments of displacement. As a result, there are equally and incrementally spaced alternate north and south pole faces 11 and 12 disposed in a circumferential series.

The rotor comprising the poles P is shown as a wheel 15 of disc configuration. The wheel 15 is carried on a shaft 16 rotatably journaled on bearings supported in or relatively to the frame 10, so that the wheel 15 is revoluble on the central axis of the machine, to drive the shaft. Therefore, the wheel 15 is true to revolve in a circumferential plane spaced from and parallel to the plane which is common to the pole faces 11 and 12.

In carrying out the invention, the pole faces 11 and 12 are placed or centered at a common radius, and the poles P are mounted or placed in the wheel 15 to move in a circle coincidental with the radius placement of said magnet faces. Thus, in accordance with the invention, the poles P are provided each with at least one face 17, which faces are in a common circumferential plane juxtapositioned to the said plane in which the pole faces 11 and 12 are disposed. However, the faces 17 do not touch the faces 11 and 12, and they preferably closely parallel the latter faces.

The general relationship of magnets M and poles P, as above described makes for an operable electric machine of the type under consideration, but the efficiency and capacity of the machine is advantageously increased by employing double ended poles P with magnetic conduction of flux at the side of the wheel 15 opposite the first mentioned magnets M. This magnetic conduction can be gained by flux carrying bars as indicated, but it is preferred to advantageously construct these bars of magnetic material the same as magnets M. Therefore, the electric machine is preferably compound in that each magnet M has a complementary magnet M' with pole faces 11' and 12' and the poles P are provided with faces 18 related to the faces 11' and 12' the same as above described in connection with the first mentioned side of the wheel. In other words, the wheel 15 is two sided with the poles P operable between opposed and complementary sets of magnets M and M'. As a consequence, the magnets M and M' have opposed pole faces 11 and 12', and 12 and 11', respectively, in order to have continuity of magnetic flux.

As clearly illustrated throughout the drawings there is a pole P intermediate the magnet poles 11 and 12' and/or 12 and 11', when there is also a pole P aligned with the magnet faces 11 and 12' or 12 and 11'. It will be apparent that the poles P of ferrous material will be attracted into alignment with a magnetic axis extending between the pole faces 11 and 12' and/or 12 and 11', and as a result the rotor R as thus far described will seek magnetic equilibrium on this or these magnetic axes. However, in accordance with the invention, this equilibrium is predeterminably controlled by affecting the magnetic polarity of the pole P, and this is effected by winding W surrounding each pole P and alternating its polarity with respect to the magnets M and M'. For example, the pole P is attracted toward the magnetic axis of relatively opposite polarity, and is likewise repelled from a magnetic axis of relatively same polarity. Therefore, this invention involves the commutation of the windings W and the energizing of the same in order to polarize the poles P so as to be alternately attracted to and repelled from the magnetic pole faces 11 and 12' and/or 12 and 11'. In the drawings, there is shown a commutator C adapted to receive energizing direct current from power lines 20 and diagrammed so as to alternately attract and repel the poles P to and from the magnetic axes as above described.

In FIG. 3 of the drawings the commutator C is diagramatically illustrated and is particularly adapted to control two separate series of poles P. For example, as in the form of the invention illustrated, when there are sixteen poles P and eight magnets M and M' there will be two series of poles P alternately arranged together as shown. In accordance with the invention the commutator C is wired, as indicated, to alternately and separately energize the two series of poles P, since they are displaced from each other by 22½°. Therefore, the commutator C is separated into two sections that are rotatively displaced from each other by said 22½° and each of which controls the polarity of one of said series of poles.

In carrying out the invention the poles P are oppositely polarized by the windings W. That is, each successive or circumferentially adjacent pole P is wound oppositely, as is clearly illustrated. With the field and armature as hereinabove described the extreme and parmanent pull of magnets is controllably employed by the poles P which can be reversed in polarity. Therefore, it should be clear that the poles P are efficiently operable to alternately attract and repel themselves to and from the magnetic axis or axes whereby motive force is applied to the wheel 15.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A rotary electric machine having stator and rotor elements wherein;
   (a) one of said elements includes a series of magnets with angularly spaced pole faces disposed in a circumferential plane normal to the central axis of the machine;
   (b) the other of said elements includes twice as many poles as there are magnet pole faces and each pole being oppositely wire-wound relative to the next adjacent pole and each with a face revoluble through a path juxtapositioned closely to and parallel with the plane of the pole faces of the first mentioned magnets;
   (c) and means commutating electrical current to the said wire-wound poles alternately to attract and then repel them from the said spaced pole faces of the first mentioned magnets.

2. A rotary electric machine having stator and rotor elements wherein;
   (a) said stator element includes, a circumferentially disposed magnet with angularly spaced pole faces disposed in a plane normal to the central axis of the machine, and a complementary circumferentially disposed magnetic flux conductor with pole faces spaced parallel from and opposed to the magnet pole faces respectively;
   (b) said rotor element includes at least two independent poles that are oppositely wire-wound and each with axially opposite faces revoluble through a path juxtapositioned between and parallel closely to the pole faces of the first mentioned magnet and flux conductor respectively;
   (c) and there is means commutating electrical current to the said wire-wound poles alternately to attract and then repel them from the said spaced pole faces of the first mentioned magnet.

3. A rotary electric machine having stator and rotor elements wherein;
   (a) said stator element includes, a series of circumferentially disposed magnets and each with angularly spaced pole faces disposed in a plane normal to the central axis of the machine, and a complementary series of circumferentially disposed magnetic flux conductors and each with angularly spaced pole faces spaced parallel from and opposed to the magnet pole faces respectively;
   (b) said rotor element includes independent poles that are oppositely wire-wound and each with axially opposite faces revoluble through a path juxtapositioned between and parallel closely to the pole faces of the first mentioned magnets and flux conductors respectively;
   (c) and there is means commutating electrical current to the said wire-wound poles alternately to attract and then repel them from the said spaced pole faces of the first mentioned magnets.

4. A rotary electric machine having stator and rotor elements wherein;
   (a) said stator element includes a set of axially spaced circumferentially disposed magnets and each magnet having angularly spaced pole faces disposed in spaced and opposed parallel planes normal to the central axis of the machine;
   (b) said rotor element includes at least two independent poles that are oppositely wire-wound and revoluble about the central axes and disposed axially between the spaced pole faces of the first mentioned magnets and having axially opposite and parallel faces closely juxtapositioned to the opposed pole faces of the first mentioned magnets;
   (c) and there is means commutating electrical current to the said wire-wound poles alternately to attract and then repel them from the said spaced pole faces of the first mentioned magnets.

5. A rotary electric machine having stator and rotor elements wherein;
   (a) said stator element includes a series of axially spaced circumferentially disposed magnets and each magnet having angularly spaced pole faces disposed in spaced and opposed parallel planes normal to the central axis of the machine;
   (b) said rotor element includes independent poles that are oppositely wire-wound and revoluble about the central axis and disposed axially between the spaced pole faces of the first mentioned magnets and having axially opposite and parallel faces closely juxtapositioned to the opposed pole faces of the first mentioned magnets;
   (c) and there is means commutating electrical current to the said wire-wound poles alternately to attract and then repel them from the said spaced pole faces of the first mentioned magnets.

6. A rotary electric machine of the character described and including;
   (a) a stator comprising a circumferentially disposed magnet with angularly spaced pole faces disposed in a plane normal to the central axis of the machine, and a complementary circumferentially disposed magnetic flux conductor with pole faces axially spaced from and opposed to the magnet pole faces respectively;

(b) a rotor comprising twice as many poles as there are magnet pole faces and each pole being oppositely wire-wound and each with axially opposite faces revoluble through a path juxtapositioned between and parallel closely to the pole faces of the first mentioned magnet and flux conductor respectively;

(c) and means commutating electrical current to the said wire-wound poles alternately to attract and then repel them from the said spaced pole faces of the first mentioned magnet.

7. A rotary electric machine of the character described and including;

(a) a stator comprising a series of circumferentially disposed magnets and each with angularly spaced pole faces disposed in a plane normal to the central axis of the machine, and a complementary series of circumferentially disposed magnetic flux conductors and each with angularly spaced pole faces spaced parallel from and opposed to the magnet pole faces respectively;

(b) a rotor comprising twice as many independent poles as there are magnet pole faces and each pole being oppositely wire-wound and each with axially opposite faces revoluble through a path juxtapositioned between and parallel closely to the pole faces of the magnets and flux conductors respectively;

(c) and means commutating electrical current to the said wire-wound poles alternately to attract and then repel them from the said spaced pole faces of the first mentioned magnets.

8. A rotary electric machine of the character described and including;

(a) a stator comprising a set of axially spaced circumferentially disposed magnets and each magnet having angularly spaced pole faces disposed in spaced and opposed parallel planes normal to the central axis of the machine;

(b) a rotor comprising twice as many poles as there are magnet pole faces and each pole being oppositely wire-wound and revoluble about a central axis and disposed axially between the spaced pole faces of the first mentioned magnets and having opposite faces closely juxtapositioned to the opposed pole faces of the first mentioned magnets;

(c) and means commutating electrical current to the said wire-wound poles alternately to attract and then repel them from the said spaced pole faces of the first mentioned magnets.

9. A rotary electric machine of the character described and including;

(a) a stator comprising a series of circumferential disposed axially spaced magnets and each magnet having angularly spaced pole faces disposed in spaced and opposed parallel planes normal to the central axis of the machine;

(b) a rotor comprising twice as many independent poles as there are pole faces and that are oppositely wire-wound and revoluble about the central axis and disposed axially between the spaced pole faces of the first mentioned magnets and having axially opposite and parallel faces closely juxtapositioned to the opposed pole faces of the first mentioned magnets;

(c) and means commutating electrical current to the said wire-wound poles alternately to attract and then repel them from the said spaced pole faces of the first mentioned magnets.

References Cited
UNITED STATES PATENTS

| | | | |
|---|---|---|---|
| 1,666,065 | 4/1928 | Anderson | 310—46 |
| 1,863,294 | 6/1932 | Bogia | 310—46 |
| 2,279,690 | 4/1942 | Lindsey | 310—46 |
| 2,281,081 | 4/1942 | Sheldon | 310—46 |
| 2,408,375 | 10/1946 | Collins | 310—46 |
| 2,623,187 | 12/1952 | Adams | 310—154 |
| 3,247,407 | 4/1966 | Bruneel | 310—168 X |

MILTON O. HIRSHFIELD, *Primary Examiner.*

D. F. DUGGAN, *Examiner.*